Nov. 6, 1928.  
C. A. LAEMMEL  
1,690,904  
CUTTER OR KNIFE FOR MEAT GRINDING MACHINES  
Filed Oct. 20, 1927
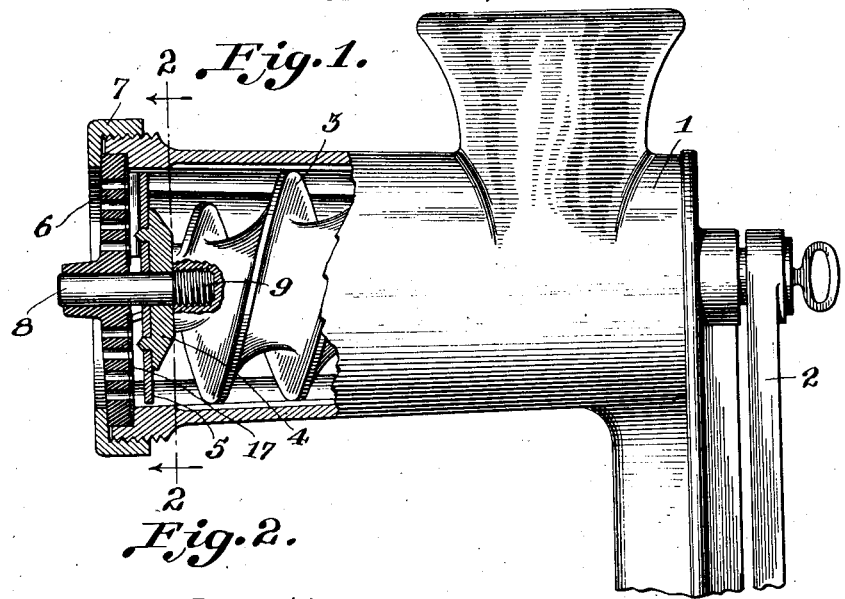
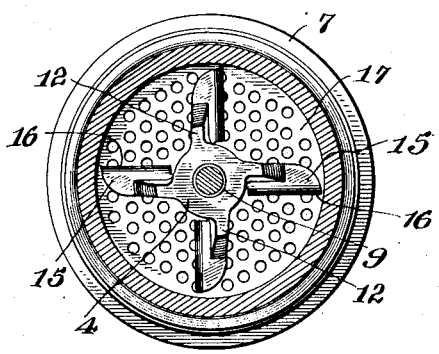
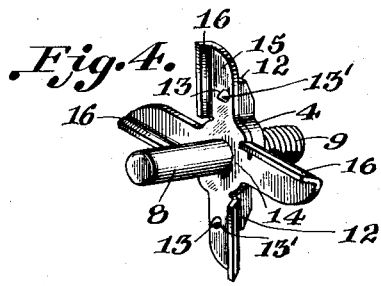
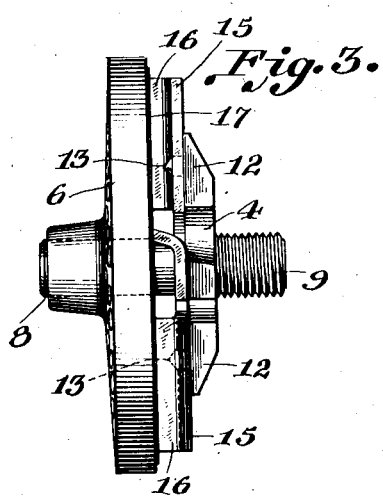
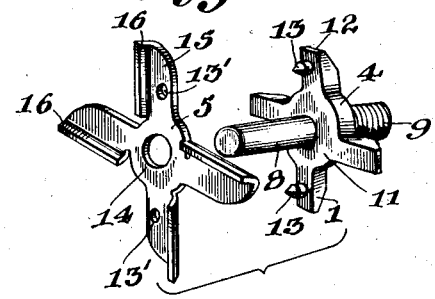
Inventor  
Charles A. Laemmel  
By Parker Cook  
Attorney Patented Nov. 6, 1928.

1,690,904

UNITED STATES PATENT OFFICE.

CHARLES A. LAEMMEL, OF BROOKLYN, NEW YORK, ASSIGNOR TO ATLANTIC SERVICE COMPANY, INC., OF BROOKLYN, NEW YORK, A CORPORATION OF NEW YORK.

CUTTER OR KNIFE FOR MEAT-GRINDING MACHINES.

Application filed October 20, 1927. Serial No. 227,486.

My invention relates to new and useful improvements in meat choppers and more particularly to the knife or rotary cutter and its manner of support.

As is well known to those skilled in the art, meat choppers in general consist of a cylinder in which there is a means such as a spiral for advancing the meat, while at the front end of the cylinder is located a knife that is rotated through the motion of the spiral. In front of the knife is located a plate provided with a plurality of openings through which the meat is forced, to thus produce the long thin threads.

There are many different forms of knives or rotary cutters used in conjunction with these meat choppers and the present invention contemplates the use of a special form of support on which there is removably mountd the novel rotary knife or cutter.

Another object of the invention contemplates the use of a knife which is simply a metal stamping so that these knives may be made up commercially in larger quantities at a minimum price.

Still another object of the invention is to provide a means of support in the form of a spider, two opposite arms of which may be provided with small pins, so that the knife or rotary cutter may be placed up against the spider and pinned against rotary movement with relation to the spider but at the same time may be quickly removed when it is desired to either sharpen the knife or to substitute a new one.

With these and other objects in view, the invention consists in certain new and novel arrangements and combination of parts, as will be hereinafter more fully described and pointed out in the claims.

Referring now to the drawings showing a preferred embodiment,

Fig. 1 is a fragmentary view in elevation with a portion broken away to show the knife and holder in section.

Fig. 2 is a sectional view taken on line 2—2 looking in the direction of the arrows.

Fig. 3 is an end view of the plate and the knife and cutter in position.

Fig. 4 is a prospective of the knife on its spider, and

Fig. 5 is a view showing the knife and spider before assembly.

Referring now more particularly to the several views, there is shown in Fig. 1, a conventional form of meat chopper comprising the body 1 and the handle 2, there being mounted in the body the conventional spiral 3, in which is threaded a portion of the spider or support 4.

The knife or cutter 5 is shown in position and abuts or contacts with the inner surface of perforated plate 6, which plate forms the subject matter of a co-pending application, filed by me on October 7, 1927, bearing Serial No. 224,584. This plate may be held in position by a cap 7, as the plate and knife are often removed to clean the chopper or when it is desired to install a new plate or a new knife.

Referring now more specifically to the gist of the invention and to Figs. 4 and 5 for the moment, I have shown a support for the knife or what I term the spider 4, which comprises the short shank 8, which is threaded at 9 and on which there may be tightly sweated the body portion 11 having the radial arms 12, while tightly secured on one surface of two of the arms are the small pins 13. This spider may be in the form of a small casting or may be a stamping or may be otherwise made just so it is strong and commercially cheap.

Now designed to be mounted on this spider is the rotary knife or cutter 5, which may be a metal stamping and consist of the hub 14 while extending from the hub are the four blades 15, which have their outer edges offset as at 16, which edges may then be ground, so that when these edges rotate on the hardened surface 17 of the plate 6, they will quickly cut the meat that is being forced through the chopper.

Heretofore the knives in most instances were made from either high speed tool steel or other expensive forms of steel and are relatively expensive to manufacture. The present knife is a far cheaper form, as it may be stamped out with dies in a heavy press and the off-set edges of the blades quickly sharpened.

Again the cost of the knife is so relatively low that it may be discarded and a new one substituted, as a number of these knives can be manufactured at the cost of one of the old form.

This knife or cutter is provided with two small holes 13', that are designed to register with the pins 13 of the spider, so that a movement of the spider will transmit its motion to the rotary knife or cutter.

By providing a structure of this kind, it will be seen that the rotary cutter snugly fits on the shaft 8 and is tightly pinned with relation to the spider while at the same time the arms of the spider brace the plates of the cutter, making it possible to use a cutter that is simply a thin metal stamping.

Furthermore, it is but the work of a moment to take out the plate and simply withdraw the cutter and slip a new one in place when desired.

I am aware that it is old to provide cutters that may be readily inter-changeable and it is old to provide backing plates for the cutters or to provide several plates, but as far as I am aware, it is new and novel to provide a relatively cheap and strong spider, on which a cutter is to be pinned and which cutter consists of a thin sheet of metal with portions removed to form blades which blades in turn are simply off-set at their edges and sharpened.

Many slight changes might be made without in any way departing from the spirit and scope of the invention.

Having thus described the same what I claim is new and desire to secure by Letters Patent is:—

1. A cutter for a meat grinder comprising a spider, said spider comprising a shaft and the spider arms in fixed relation with the shaft, outwardly extending pins on the spider, a knife provided with holes to fit on the pins of the spider and said knife being quickly detachable from the spider.

2. A cutter for meat grinder comprising a spider, said spider comprising a shaft and a member provided with arms tightly fitting on said shaft, projecting pins on said spider, a knife having means to cooperate with said pins on said spider for preventing rotation with respect of one to the other and said knife comprising a plurality of integral blades, the cutting edges of which are off-set from the normal plane of the blades.

3. A cutter for a meat grinder comprising a shaft, spider arms fixedly mounted on said shaft, a knife comprising radial blades and adapted to register with the arms of the spider and fixed means spaced from the ends of the spider arms cooperating with the knife for preventing rotation of one with regard to the other, and said means allowing for the quick removal of said knife.

4. A quickly detachable cutter for a meat grinder, comprising a threaded shaft, a spider fixedly mounted on said shaft, a knife fitting on said shaft and quickly detachable therefrom, said spider provided with pins and said knife provided with holes to register with said pins to prevent rotation of the knife with respect to the spider.

In testimony whereof I affix my signature.

CHARLES A. LAEMMEL.